US010650627B1

(12) United States Patent
Carbonell et al.

(10) Patent No.: US 10,650,627 B1
(45) Date of Patent: May 12, 2020

(54) COGNITIVE VETTING SYSTEM FOR UNSOLICITED RESIDENTIAL VISITORS

(71) Applicant: INTERNATIONAL BUSINESS MACHINES CORPORATION, Armonk, NY (US)

(72) Inventors: Lee A. Carbonell, Flower Mound, TX (US); Tsz Cheng, Grand Prairie, TX (US); Jeff L. Edgington, Fort Worth, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/184,292

(22) Filed: Nov. 8, 2018

(51) Int. Cl.
  *G07C 9/00*     (2020.01)
  *G06N 5/04*     (2006.01)

(52) U.S. Cl.
  CPC ......... *G07C 9/00563* (2013.01); *G06N 5/043* (2013.01)

(58) Field of Classification Search
  CPC ........................... G07C 9/00563; G06N 5/043
  See application file for complete search history.

(56) References Cited

U.S. PATENT DOCUMENTS

| | | | |
|---|---|---|---|
| 6,778,085 B2 | 8/2004 | Faulkner et al. | |
| 7,541,926 B2 | 6/2009 | Dugan et al. | |
| 8,629,755 B2 | 1/2014 | Hashim-Waris | |
| 9,685,071 B1 | 6/2017 | Fu et al. | |
| 9,940,801 B2 | 4/2018 | Phillips | |
| 9,978,238 B2 | 5/2018 | Fadell et al. | |
| 2006/0063517 A1 | 3/2006 | Oh et al. | |
| 2008/0130956 A1 | 6/2008 | Jordan et al. | |
| 2008/0198006 A1 | 8/2008 | Chou | |
| 2011/0248818 A1 | 10/2011 | Hashim-Waris | |
| 2012/0044049 A1 | 2/2012 | Vig et al. | |
| 2014/0071273 A1 | 3/2014 | Balthasar et al. | |
| 2016/0234207 A1* | 8/2016 | Bauchspies | G06F 21/31 |

OTHER PUBLICATIONS

Mell et al., "The NIST Definition of Cloud Computing", Recommendations of the National Institute of Standards and Technology, NIST Special Publication 800-145, Sep. 2011, 7 pages.
Prospero, "Best Video Doorbells of 2018", Tom's Guide, Jul. 23, 2018, 6 pages, https://www.tomsguide.com/us/best-video-doorbells,review-4468.html.
Brush et al., "Digital Neighborhood Watch: Investigating the Sharing of Camera Data Amongst Neighbors", CSCW'13, Feb. 23-27, 2013, 8 pages.

(Continued)

*Primary Examiner* — Curtis B Odom
(74) *Attorney, Agent, or Firm* — Alexis N. Hatzis

(57) ABSTRACT

A method, computer system, and a computer program product for cognitive vetting is provided. The present invention may include determining that an identified person is not expected. The present invention may include retrieving historical information relevant to a past interaction with the identified person. The present invention may then include enabling a present interaction with the identified person. The present invention may lastly include determining a recommendation based on an analysis of the retrieved historical information and the present interaction.

20 Claims, 7 Drawing Sheets

(56) References Cited

OTHER PUBLICATIONS

Youtube, "Build 2017: Workplace Safety Demonstration", May 10, 2017, 2 pages, https://www.youtube.com/watch?v=pL-c00M2Cnl.

Dqindia Online, "Xvidia Embraces AI based Real-time Cognitive Video Surveillance", DataQuest, Sep. 21, 2017, 2 pages, https://www.dqindia.com/xvidia-embraces-ai-based-real-time-cognitive-video-surveillance/.

Gajjar et al., "Human Detection and Tracking for Video Surveillance: A Cognitive Science Approach", Computer Vision and Pattern Recognition (cs.CV), Sep. 3, 2017, 5 pages, https://arxiv.org/ftp/arxiv/papers/1709/1709.00726.pdf.

Kirchheimer, "Avoiding Door-to-Door Scales Scams", printed Aug. 3, 2018, 3 pages, https://www.aarp.org/money/scams-fraud/info-06-2013/door-to-door-sales-scams.html.

Sales-Techniques, "Door-to-door sales—tips and techniques", printed Aug. 3, 2018, 12 pages, http://sales-techniques.net/door-to-door-sales-techniques/.

Szwed et al., "Risk assessment for a video surveillance system based on Fuzzy Cognitive Maps", Multimed Tools Appl, (2016), vol. 75, pp. 10667-10690.

Wham News, "Police: Woman tied up, 2 men beaten in Kelly St. home invasion", Rochester New York, printed Mar. 3, 2018, 4 pages, https://13wham.com/news/local/police-woman-tied-up-man-beaten-in-kelly-st-home-invasion.

Wikihow, "How to Answer the Door Safely", printed Aug. 3, 2018, 4 pages, https://www.wikihow.com/Answer-the-Door-Safely.

\* cited by examiner

US 10,650,627 B1

COGNITIVE VETTING SYSTEM FOR UNSOLICITED RESIDENTIAL VISITORS

BACKGROUND

The present invention relates generally to the field of computing, and more particularly to security systems.

Security systems provide a layer of defense against unsolicited visitors. Safety advice and best practices for answering doors and vetting unsolicited visitors may be available. Video doorbells, for example, among other technologies, may permit homeowners to answer a door without physically opening it, and may even permit people to remotely answer the door on behalf of unavailable individuals.

SUMMARY

Embodiments of the present invention disclose a method, computer system, and a computer program product for cognitive vetting. The present invention may include determining that an identified person is not expected. The present invention may include retrieving historical information relevant to a past interaction with the identified person. The present invention may then include enabling a present interaction with the identified person. The present invention may lastly include determining a recommendation based on an analysis of the retrieved historical information and the present interaction.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
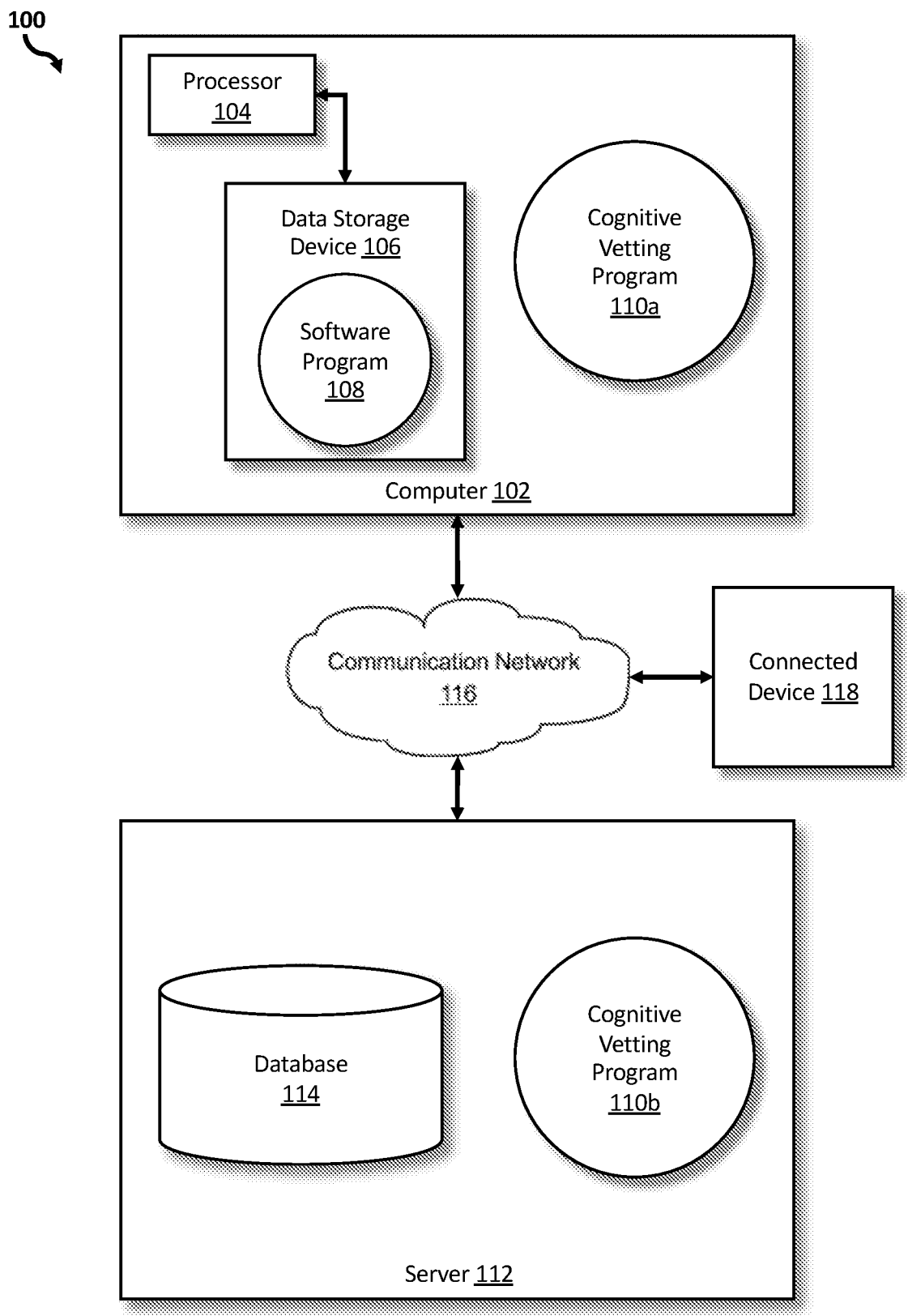
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for cognitive vetting. As such, the present embodiment has the capacity to improve the technical field of visitor assessment by providing an integrated cognitive system to analyze a conversation between a homeowner and an unsolicited visitor, and to utilize visual behavior to determine whether or not the homeowner should open the door for the unsolicited visitor. More specifically, the present invention may include determining that an identified person is not expected. The present invention may include retrieving historical information relevant to a past interaction with the identified person. The present invention may then include enabling a present interaction with the identified person. The present invention may lastly include determining a recommendation based on an analysis of the retrieved historical information and the present interaction.

Embodiments of the present invention recognize that vetting unsolicited visitors remains largely manual, inconvenient, and limited in its effectiveness. Further, the vetting process may be time consuming, difficult, and risky. For many people, it may be human nature to open a door and to engage in polite conversation with an unsolicited visitor. While engaging in polite conversation with no knowledge of the background or prior history of the unsolicited visitor, a resident may be susceptible to unintended interactions. Even with available technologies (e.g., a video doorbell) a resident may still be in harm, as the resident may not wish to bother a remote person to answer the door and vet the unsolicited visitor, and the resident may do the vetting on his or her own.

Embodiments of the present invention further recognize that current solutions may not satisfactorily address the vetting problem for unsolicited residential visitors. Simple identification (e.g., facial recognition) may not provide the requisite background information of a visitor which may be necessary to gather context and assess the visitor's purpose and/or risk. Therefore, it may be advantageous to, among other things, provide a solution which is both automatic and cognitive, which determines information relevant to past interactions of a visitor, and which provides a recommendation based on the determined information.

Embodiments of the present invention provide that all interactions with a particular visitor may be stored within the cognitive vetting program and may be analyzed instantaneously by a user of the cognitive vetting program. The interactions may be cognitively analyzed and broken down to gain insights. A user of the cognitive vetting program may utilize the stored information to vet a visitor.

Embodiments of the present invention provide that the cognitive vetting program may make details of a current interaction available within the cognitive vetting program so that a safety and contextual assessment may be done of each unsolicited visitor, and so the details of all interactions may be utilized in determining whether a homeowner should open the door for an unsolicited visitor.

Embodiments of the present invention provide that the cognitive vetting program may be comprised of a vetting system which may evaluate an unsolicited home visitor, and which may provide a recommendation as to whether a homeowner should open the door for the unsolicited visitor. The recommendation may take into consideration context of the visit based on various types of information, including but not limited to personal identification, government registries, trade certifications, and biometrics such as facial recognition and fingerprint analysis. Past information may also include verbal conversations from past visits to the same home and from past visits to homes in the surrounding area.

Embodiments of the present invention provide that the cognitive vetting program may determine context, tone, sentiment, and content of past conversations to determine if a current interaction is friendly, business-related, or something else.

Embodiments of the present invention provide that the cognitive vetting program may utilize a chat feature to collect information in real-time from an unsolicited visitor.

Embodiments of the present invention provide that the cognitive vetting program may suggest a recommended action supported by factual data and historical context.

Embodiments of the present invention provide that the cognitive vetting program may analyze an unsolicited visitor's presence from several standpoints (e.g., safety, past relationship with the homeowner, job function, etc.) and may provide a recommendation which may be taken into consideration prior to any action being necessitated by the homeowner.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cognitive vetting program 110a. The networked computer environment 100 may also include a server 112 that is enabled to run a cognitive vetting program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cognitive vetting program 110a, 110b may interact with a database 114 that may be embedded in various storage devices, such as, but not limited to a computer/mobile device 102, a networked server 112, or a cloud storage service.

According to various implementations of the present embodiment, the cognitive vetting program 110a, 110b may interact with one or more connected devices 118 which may be connected via the communications network 116. A connected device 118 may include but is not limited to including a cloud-based video doorbell, which may be connected via a cloud-based system over the Internet; a cloud-based camera, which may be connected via a corresponding cloud account over the Internet; a private camera, which may be connected via an individual Uniform Resource Locator (URL) over the Internet; a home video and/or audio device, which may be connected via a corresponding cloud account over the Internet; a computer, which may be connected via a web API over the Internet; a smartphone, which may be connected via a web API over the Internet; and any other system and/or application which may be connected via an API over a local or wireless area network (LAN or WAN, respectively).

According to the present embodiment, a user using a client computer 102 or a server computer 112 may use the cognitive vetting program 110a, 110b (respectively) to vet unsolicited residential visitors in an automated and cognitive manner. The cognitive vetting method is explained in more detail below with respect to FIGS. 2A and 2B, and FIG. 3.

Figure 2A:
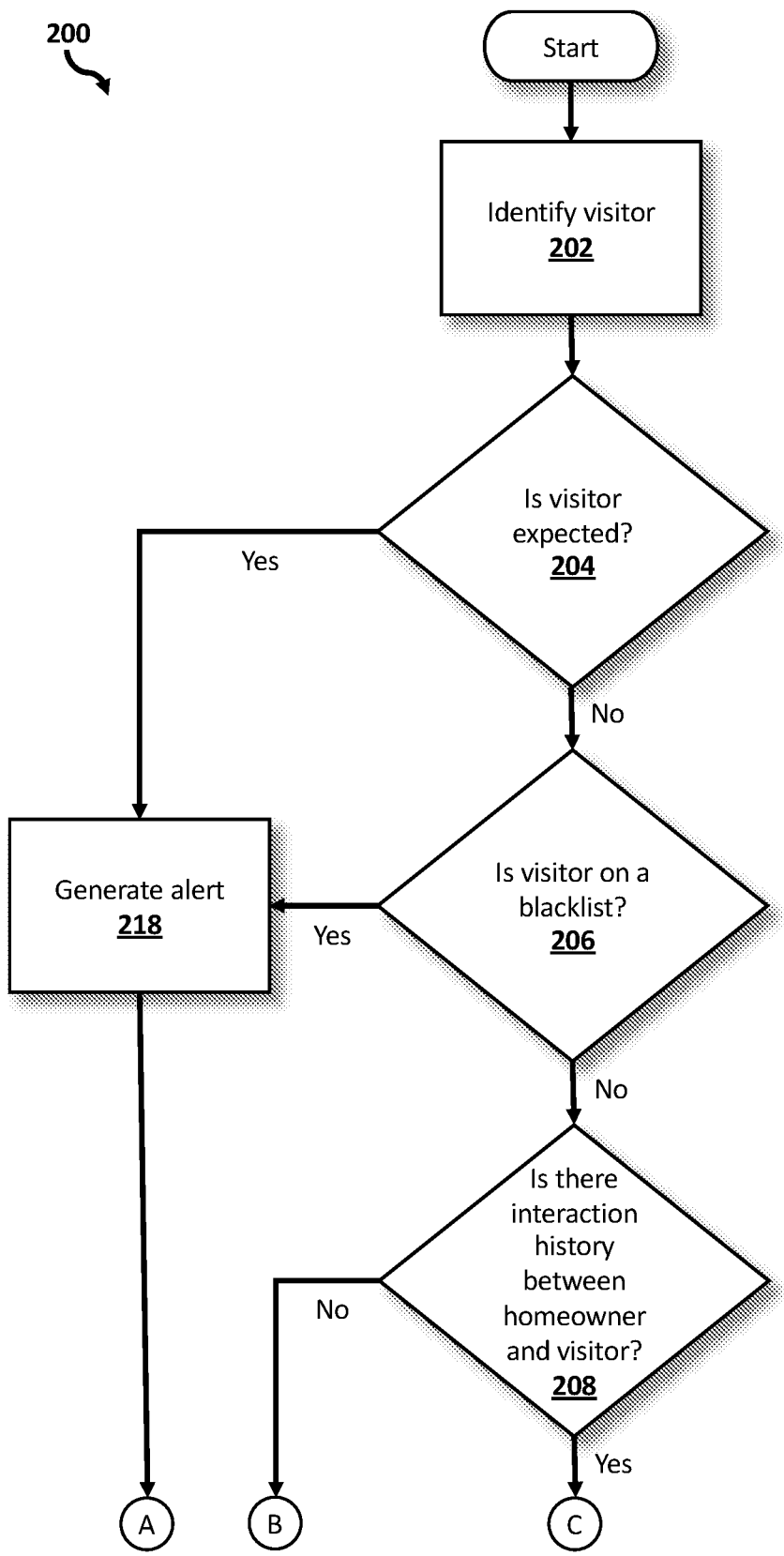
FIGS. 2A and 2B are an operational flowchart illustrating a process for vetting an unsolicited residential visitor according to at least one embodiment.
Figure 2B:
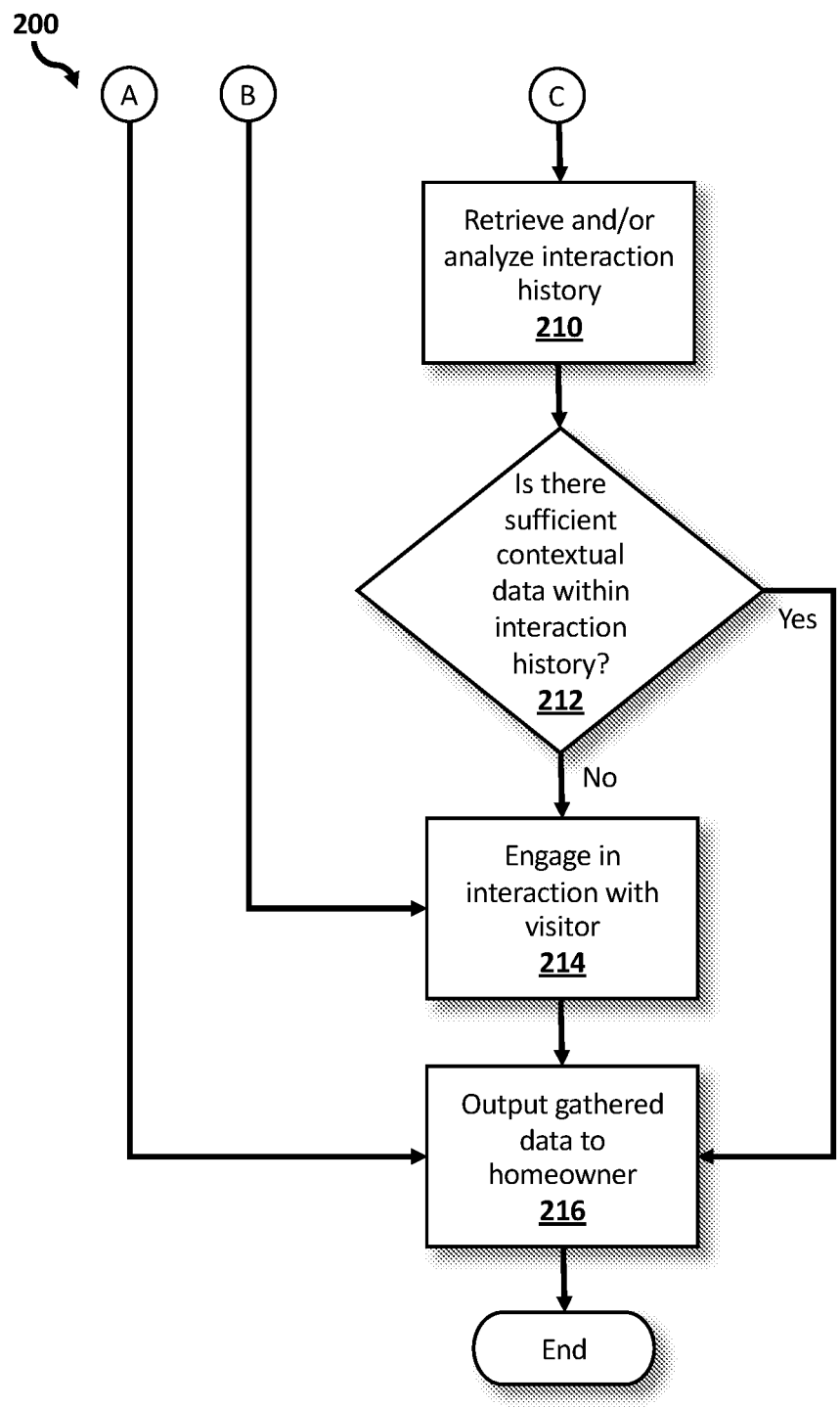

Referring now to FIGS. 2A and 2B, an operational flowchart illustrating the exemplary cognitive vetting process 200 used by the cognitive vetting program 110a and 110b according to at least one embodiment is depicted.

At 202, the cognitive vetting program 110a, 110b identifies a visitor. The cognitive vetting program 110a, 110b (i.e., Cognitive Vetting System (CVS)) may be a cloud-based system with a set of application programming interfaces (APIs), which can be accessed from or integrated with any clients and/or servers such as camera devices, home devices, mobile devices, computers or any other systems and/or applications. Cognitive vetting program 110a, 110b can utilize a first-time registration process to compile a homeowner or resident (i.e., a user) profile, and may gather personal information of the homeowner or resident, including but not limited to name, address, and contact information. The cognitive vetting program 110a, 110b may also gain access to social media accounts (e.g., content on interactive websites accessed via web-based technologies on desktops and/or laptops, among other devices, which websites may facilitate the creation and sharing of information and/or ideas, among other forms of expression), camera accounts (e.g., accounts for web-based camera technologies which may provide a live stream of a connected camera feed), and home device accounts (e.g., smart speakers which may connect to a voice-controlled intelligent personal assistant). The accessed camera accounts may be connected to the Internet via a wired or a wireless network.

The cognitive vetting program 110a, 110b may permit the addition of additional devices via the APIs, as mentioned previously, as new devices become available to and/or preferred by the user. Examples of connected devices may include, but are not limited to, a cloud-based video doorbell, which may be connected via a cloud-based system over the Internet; a cloud-based camera, which may be connected via a corresponding cloud account over the Internet; a private camera, which may be connected via an individual Uniform Resource Locator (URL) over the Internet; a home video and/or audio device, which may be connected via a corresponding cloud account over the Internet; a computer, which may be connected via a web API over the Internet; a smartphone, which may be connected via a web API over the Internet; and any other system and/or application which may be connected via an API over a local or wireless area network (LAN or WAN, respectively).

The cognitive vetting program 110a, 110b may permit flexibility and customization by the homeowner (i.e., the user) based on how the homeowner chooses to have the cognitive vetting program 110a, 110b interact with visitors. There may, according to at least one embodiment, be a screen display with a keyboard and/or a keypad and a speaker positioned outside of the homeowner's home. There may, alternatively, be a screen, a camera, a speaker, and a microphone positioned outside of the homeowner's home. A visitor may interact with the homeowner's input devices, which devices may be configured by the homeowner within the interface for the cognitive vetting program 110a, 110b, and which configurations may be based upon the compatible devices owned by the homeowner (e.g., those devices which may interact with the cognitive vetting program 110a, 110b).

For identification purposes, a visitor may show a valid identification card to a homeowner's camera, and/or the visitor may provide his or her name and may answer questions posed regarding the visitor's identity. Based on the visitor's answers to questions posed, and further based on information contained within public safety resources (e.g., connected news websites and/or police databases), the cognitive vetting program 110a, 110b may match the user to recent activity which may have occurred within a predefined number of miles from the homeowner's home. The cognitive vetting program 110a, 110b may utilize both the stated name and a captured photo to identify the visitor and to match the visitor to recent local activity.

If the identity of a visitor is not able to be matched after a given question/input sequence, then the cognitive vetting program 110a, 110b may pose additional clarifying questions to permit further visitor input. The cognitive vetting program 110a, 110b may be trained as a dynamic chatbot, based on known methodologies, to utilize natural language processing techniques with decision trees to determine an appropriate question and to determine whether received answers are sufficient to enable the chatbot to move on to a next set of questions and/or topics. The cognitive vetting program 110a, 110b may utilize Artificial Intelligence (AI) and/or machine learning to enable the chatbot to continuously grow more capable of understanding interactions between all visitors, and to enable the decision tree to interpret the context and/or language, ultimately making a decision as to any next action, question, and/or topic.

The cognitive vetting program 110a, 110b may detect, via video and/or connected sensor device (e.g., infrared and/or radar, among others) that a visitor is approaching a homeowner's entrance. The homeowner's preferences, as discussed previously, may dictate how and when the cognitive vetting program 110a, 110b will first begin to interact with the visitor. For example, the cognitive vetting program 110a, 110b may proactively greet and/or prompt the visitor as he or she approaches the entrance. Alternatively, the cognitive vetting program 110a, 110b may detect the visitor but may wait to greet the visitor until after the visitor initiates an interaction with the homeowner via a doorbell or touchscreen input device. Connecting a physical doorbell may be an optional input, and it may be at the discretion of the homeowner to decide whether to use a doorbell as the trigger to initiate an interaction with the visitor.

At 204, the cognitive vetting program 110a, 110b determines that the visitor is not expected. When a visitor arrives at the homeowner's door, the cognitive vetting program 110a, 110b may verify and/or identify the visitor based on the visitor database, through APIs, utilizing visual recognition techniques. The cognitive vetting program 110a, 110b may verify and/or identify the visitor by tagging, classifying, and training visual content using machine learning. A machine learning model may be trained, using positive and negative images, to identify regularities in data and to classify the data into different categories (e.g., to identify a visitor based on similarities of the trained data and any newly gathered visual content).

If a visitor visits the homeowner's home or a neighboring home, then cognitive vetting program 110a, 110b can capture, save, and store images of the visitor within the data storage device 106 and/or database 114. Cognitive vetting program 110a, 110b can utilize connected camera devices to capture images and save the captured images on a connected hard drive or a connected cloud database, based on the preferences of the user. The stored images may thereafter be used to train a machine learning model on characteristics of the visitor.

For example, a homeowner's neighbor is enrolled in the cognitive vetting program 110a, 110b and has installed camera devices to capture the exterior of the neighbor's home. The camera devices are able to capture images of a visitor, and the cognitive vetting program 110a, 110b is trained using the captured images. Thereafter, a different visitor visits the homeowner's home. Characteristics of this visitor are not consistent with the trained data, and therefore the cognitive vetting program 110a, 110b cannot determine the identity of the visitor. Based on a lack of information concerning the visitor, and thus an inability to determine the visitor's identity, the cognitive vetting program 110a, 110b may determine that the visitor is not expected. If, however, identified characteristics of the visitor were consistent with the trained data, then the cognitive vetting program 110a, 110b may have been able to identify the visitor. In this instance, the cognitive vetting program 110a, 110b may have determined that the visitor was expected, or may have determined the purpose for the visitor's visit, based on the visitor's prior visits to neighboring homes.

In response to identifying a visitor, the cognitive vetting program 110a, 110b may access any interaction history (i.e., a historical interaction) and insights for the visitor from a connected cloud storage system or local storage system, using APIs. The cognitive vetting program 110a, 110b may store any interaction, including audio, video, and/or any insights gathered from the visitor's current visit under a visitor profile for the identified visitor. If cognitive vetting program 110a, 110b does not identify the visitor, then the cognitive vetting program 110a, 110b may create a new visitor profile with unique identification information and may store current interactions and/or insights under the newly created visitor profile.

At 206, the cognitive vetting program 110a, 110b determines that the visitor is not on a blacklist. The cognitive vetting program 110a, 110b may determine that the visitor is not on a blacklist based on a comparison of the visitor's likeness and identification (e.g., by using similar facial recognition techniques to those described above) to one or more connected blacklist databases, including but not limited to local police databases and a personal blacklist database within the cognitive vetting program 110a, 110b account of the homeowner. A visitor may be manually added to a homeowner's blacklist database at any time and at the sole discretion of the homeowner.

At 208, the cognitive vetting program 110a, 110b determines that there is interaction history between the homeowner and the visitor. The cognitive vetting program 110a, 110b may determine that there is interaction history (i.e., a historical interaction) based on an identification of the visitor by the trained machine learning model, as described previously with respect to step 204 above. To reiterate, the cognitive vetting program 110a, 110b may utilize a machine learning model to recognize a visitor's face, by comparing newly captured images of the visitor to previously captured, saved, and stored images of the visitor. If the cognitive vetting program 110a, 110b recognizes the visitor (e.g., determines that the visitor has visited the area in the past), then the cognitive vetting program 110a, 110b may locate a visitor profile for the visitor, which may contain interaction history (i.e., a historical interaction) between the homeowner and the visitor, or between the visitor and another person (e.g., a neighbor).

Interaction history (i.e., a historical interaction) between the homeowner and the visitor may be comprised of two components, one being the content, including both video and/or audio of a visitor interaction, and the other being the insights gained from the interaction (e.g., a determination of a visitor's purpose in visiting the homeowner). Any gathered insights may be stored in a public cloud storage system, as well as locally on the homeowner's device, based on the homeowner's preferences and connected devices.

In real time, the cognitive vetting program 110a, 110b may use speech-to-text functionality to transcribe a past interaction with the visitor and may use cognitive APIs to receive insights about the past interactions. Cognitive vetting program 110a, 110b can gather and store the insights, as described previously, under the identified visitor profile, which may be located on the cloud and/or locally on the homeowner's device and may be available for future access.

Also, in real time, the cognitive vetting program 110a, 110b may stream a past interaction video to a cloud-based video analytics system, to understand the behavior of the visitor. A video analytics system may analyze the past interaction video to detect and determine identification, behavior analysis, and/or other forms of situation awareness. Any information gathered by the video analytics system may be stored under the identified visitor profile on the cloud and/or on locally on the homeowner's device and may be available for future access.

At 210, the cognitive vetting program 110a, 110b retrieves and/or analyzes the interaction history (i.e., historical interaction) between the homeowner and the visitor. Cognitive vetting program 110a, 110b can retrieve audio and/or video footage of the visitor interaction located on a public cloud storage system, regardless of whether or not the interaction was between the homeowner and the visitor.

At the end of the visitor's interaction, the cognitive vetting program 110a, 110b can provide the homeowner with an option as to whether to share the visitor interaction with other users of the cognitive vetting program 110a, 110b. If the homeowner chooses to share the content, then all audio and/or video of the user interaction stored locally may be transferred and/or shared to a public cloud storage system. However, if the homeowner chooses not to share the content, then the content may be stored locally for a period of time, based on the homeowner's retention policy, and may not be shared with other users of the cognitive vetting program 110a, 110b. A homeowner's retention policy may be entered manually at the option of the user. For example, a user may choose to save videos for a number of days, months, or even years.

Based on the above, the cognitive vetting program 110a, 110b can store insights from past interactions with a visitor in a database for another user's system to access and analyze. Once the cognitive vetting program 110a, 110b seeks to retrieve and/or analyze interaction history of a visitor, the decision of a homeowner as to whether or not to make public past interaction history with the visitor may become relevant.

At this step, the cognitive vetting program 110a, 110b can retrieve and analyze all interaction history accessible by the homeowner's cognitive vetting program 110a, 110b account. The cognitive vetting program 110a, 110b may utilize speech, conversation, and cognitive analysis to determine information relevant to past interactions based on analysis of the context, tone, sentiment, and content of a visitor interaction.

As described previously, the cognitive vetting program 110a, 110b can utilize speech-to-text functionality to transcribe any retrieved audio into text that the cognitive vetting program 110a, 110b may understand. Likewise, the cognitive vetting program 110a, 110b can utilize text-to-speech functionality to communicate retrieved data back to the homeowner. Cognitive vetting program 110a, 110b can analyze text using natural language processing technologies, such as cognitive application programming interfaces (APIs), including but not limited to a natural language classifier API and a personality insights API. Cognitive APIs may be used to understand the context of the conversation and to store the content and metadata for further analysis.

For example, tone analyzers measure the dialog between the homeowner and the visitor to determine whether the dialog is adversarial or friendly. The cognitive vetting program 110a, 110b determines an analysis of the visitor's personality from this short interaction or set of interactions. For visitors that have previously visited the homeowner's home, the cognitive vetting program 110a, 110b determines the identity of the visitor based on a tone of the visitor's speech (i.e., the visitor's tone of voice). A tone analyzer API may utilize a database of past visitor information, including past interactions between the visitor and the homeowner, to determine whether the present interaction depicts a tone which is intense, lighthearted, serious, whimsical, or witty, among many other tones of voice.

Likewise, the cognitive vetting program 110a, 110b may analyze a captured video to determine the context of a past interaction with the visitor. The cognitive vetting program 110a, 110b may determine when there is movement in the field of view, and a video analysis API may assign characteristics to the person viewed, including a determined shirt color, a determined pants color, whether the person viewed is wearing a hat, eyeglasses, and/or other accessories, whether the person viewed has facial hair, and an estimation of the height and age of the person viewed. Facial recognition technology may identify a person viewed based on a database of existing visitors or, if no existing visitor profile matches the determined characteristics of the person viewed, a new visitor profile may be created.

At 212, the cognitive vetting program 110a, 110b determines that there is not sufficient contextual data within the retrieved interaction history. This may be the case when there is no past interaction history with the visitor which may be analyzed by the cognitive vetting program 110a, 110b, and which may provide any assistance in making a determination as to whether or not the homeowner should open the door for the visitor. A determination as to sufficiency of the retrieved interaction history may be made based on the amount of interaction history that is retrieved.

For example, if the retrieved interaction history contains images of the visitor, the visitor's name, and the perceived purpose of the visitor's visit, then the cognitive vetting program 110a, 110b may determine that the retrieved interaction history is sufficient. If, however, the retrieved interaction history does not contain information that permits the cognitive vetting program 110a, 110b to determine an identity and purpose of the visitor's visit, then the cognitive vetting program 110a, 110b may engage in interaction with the visitor, as will be described in more detail with respect to step 214 below.

At 214, the cognitive vetting program 110a, 110b engages in interaction with the visitor. The cognitive vetting program 110a, 110b may contain a chatbot, as described previously. The cognitive vetting program 110a, 110b may present to the user in one or more ways, based on a preference of the user and further based on any available equipment of the homeowner. For example, additional questions may be presented to the user on a screen located at the homeowner's front door, and/or may be voiced aloud using a text-to-speech technology and recited over a speaker located at the homeowner's front door.

A chatbot may employ decision trees to engage in interaction with the visitor and to determine any additional information that may be needed. For example, the chatbot may first determine the identity of a visitor, a determination which may include questions such as "state your name," as well as further questions which may be necessary to determine and/or validate the visitor's identity. If the visitor's name, in conjunction with the visitor's captured face, is insufficient for the cognitive vetting program 110a, 110b to find and/or validate the visitor's identity, then the cognitive vetting program 110a, 110b may request the visitor's driver license number. The visitor may manually enter a requested driver license number using a connected tablet, or a photograph of the visitor's driver license may be taken, among other means of providing a visitor's driver license number, depending on the user preferences and/or connected devices.

Once the cognitive vetting program 110a, 110b has determined a visitor's identity, the cognitive vetting program 110a, 110b may begin to determine a purpose of the visitor's visit. As with any chatbots utilizing natural language and artificial intelligence and/or machine learning technology, the cognitive vetting program 110a, 110b chatbot may understand the responses of the visitor and may know to ask follow-up questions to the visitor based on the information the chatbot has already elicited, and further based on the information that the cognitive vetting program 110a, 110b requires in order to move on to the next topic and/or question.

For example, if a visitor approaches a user's doorstep and states, "My name is Bill Joblansky with ABC Pest Control," the cognitive vetting program 110a, 110b may know not to ask for the visitor's name, but may instead ask a clarifying question, such as, "I found several Bill Joblansky's, can you please state your driver license number into the microphone or place your driver license in front of the camera?"

At 216, the cognitive vetting program 110a, 110b outputs the gathered data to the homeowner. The cognitive vetting program 110a, 110b may compile all determined visitor information, as well as the video and audio of the visitor's current interaction with the cognitive vetting program 110a, 110b.

A scoring and/or ranking engine may facilitate the process of creating a recommendation to the homeowner on whether or not to open the door for the visitor. The scoring and/or ranking engine may consider the homeowner's defined preferences in determining whether or not to open the door. The cognitive vetting program 110a, 110b may output a conclusion to the homeowner on a computer and/or tablet (e.g., a homeowner interaction node), among many other connected devices of the user, and the homeowner may be given a choice to follow the received recommendation of the cognitive vetting program 110a, 110b.

For example, an unsolicited visitor rings a homeowner's doorbell. The homeowner has registered with the cognitive vetting program 110a, 110b and has installed a connected camera system outside the homeowner's home. The connected camera system captures images of the visitor and the cognitive vetting program 110a, 110b compares the captured images to a trained machine learning model to identify the visitor using facial recognition techniques. The cognitive vetting program 110a, 110b utilizes facial recognition techniques to match the captured images of the visitor to previously captured images of visitors which are stored within the cognitive vetting program 110a, 110b. The cognitive vetting program 110a, 110b locates a visitor profile for the visitor which contains past interaction history between the visitor and the homeowner's neighbors. The past interaction history includes images of the visitor, the visitor's name, date of birth, occupation, and linked social media accounts. There is also an insight previously made by the cognitive vetting program 110a, 110b, based on the visitor's interaction with the homeowner's neighbors, that the purpose of the visitor's visit may be to deliver flowers from a local flower shop. The visitor profile within the cognitive vetting program 110a, 110b also indicates that the homeowner's neighbor answered the door for the unsolicited visitor. Based on this information, the cognitive vetting program 110a, 110b provides a recommendation to the homeowner that the homeowner should open the door for the visitor.

Despite the recommendation provided by the cognitive vetting program 110a, 110b, the homeowner may take any action that the homeowner determines is appropriate.

Finally, for purposes of cognitive learning (e.g., improving the skills and knowledge of the cognitive vetting program 110a, 110b) the homeowner may validate a recommendation by indicating within the cognitive vetting program 110a, 110b any action which may have ultimately been taken by the homeowner. The homeowner's indication may become an input to the cognitive vetting program 110a, 110b learning algorithm and may assist in future determinations made by the cognitive vetting program 110a, 110b.

If, at 204, the cognitive vetting program 110a, 110b determines that the visitor is expected, then at 218 the cognitive vetting program 110a, 110b generates an alert to output to the user at 216. An alert may contain characteristics of the identified individual determined by the cognitive vetting program 110a, 110b at 202, and may be communicated in written or verbal format, depending on the preferences of the user as configured within the user's profile of the cognitive vetting program 110a, 110b. An alert may be an email communication which may be sent to a predetermined address of the user, or a notification on the user's smartphone, tablet, or other computing device, based on the preferences of the user as configured within the user's profile of the cognitive vetting program 110a, 110b. An alert may also be a verbal communication recited from a device of the user connected to the cognitive vetting program 110a, 110b.

If, at 206, the cognitive vetting program 110a, 110b determines that the visitor is on a blacklist, then at 218 an alert is generated which is outputted to the user at 216. As described above, an alert may contain characteristics of the identified individual determined by the cognitive vetting program 110a, 110b at 202.

If, at 208, the cognitive vetting program 110a, 110b determines that there was not interaction history between the homeowner and the visitor, then at 214 the cognitive vetting program 110a, 110b engages in interaction with the visitor and at 216 the gathered data is outputted to the homeowner.

If, at 212, the cognitive vetting program 110a, 110b determines that there is sufficient contextual data within the retrieved interaction history, then at 216 the gathered data is outputted to the homeowner.

Figure 3:
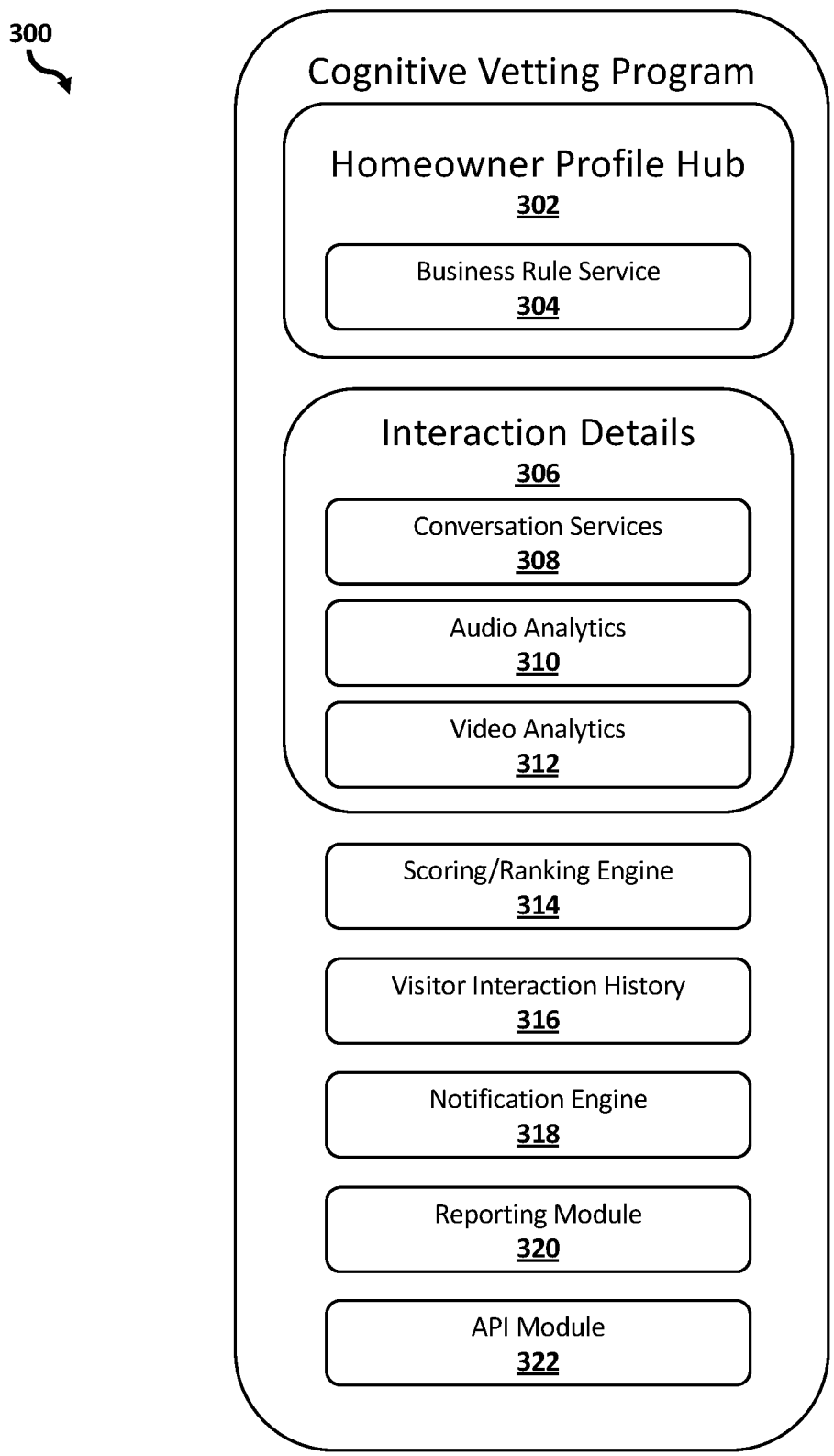
FIG. 3 is a block diagram of the cognitive vetting program according to at least one embodiment.

Referring now to FIG. 3, a block diagram 300 of the cognitive vetting program 110a, 110b according to at least one embodiment is depicted. The cognitive vetting program 110a, 110b may be comprised of the systems and functions described below, and may be accessed by the user (i.e., homeowner) by a physical node, including a touchscreen panel inside the homeowner's home or through a mobile or web application. Likewise, a visitor of the homeowner's home may interact with the cognitive vetting program 110a, 110b by external physical devices, which may be placed outside the homeowner's home. External physical devices of the homeowner may include a microphone, a video camera, and a touchscreen panel, among other connected devices.

Any data collected during a visit may be stored in a package within the cognitive vetting program 110a, 110b, which may map to a database holding all collected information. Each visit with a visitor may be a separate entry into the connected database.

The homeowner profile hub 302 may store a user profile and any user preferences which may be defined by the homeowner. There may be a questionnaire or survey format to initially provide inputs into the homeowner profile hub 302 by the homeowner. The business rule service 304 may store information concerning how the homeowner intends on using the system. For example, a homeowner may provide a threshold which must be reached before the cognitive vetting program 110a, 110b may recommend that the homeowner answer and open the door for an unsolicited visitor. Further, the cognitive vetting program 110a, 110b may be configured by the homeowner to recommend that the homeowner shall not interact with salespeople.

Interaction details 306 may be a service that facilitates the technology that is used to collect the information relevant to generating a recommendation by the cognitive vetting program 110a, 110b. Interaction details 306 may be comprised of conversation services 308, audio analytics 310, and video analytics 312. Conversation services 308 may provide the ability of the cognitive vetting program 110a, 110b to interact with a visitor verbally. Conversation services 308 may understand the context of the conversation and may be able to produce an intelligible conversation. In addition to speech-to-text and text-to-speech technology, audio analytics 310 may facilitate building an understanding of the nuances of a conversation and may function by leveraging a tone analyzer API and a personality insights API (both previously discussed with respect to step 210 above). Lastly, based on computer vision technology, the cognitive vetting program 110a, 110b may utilize video cameras to provide further context to a conversation, and may utilize facial recognition technology to identify an unsolicited visitor.

The scoring/ranking engine 314 may take all of the inputs of a conversation, including any conversation history, and may provide a score that determines whether or not a homeowner should open the door for an unsolicited visitor. A generated score may be a numerical value corresponding to an average of all considered factors, including job title of an unsolicited visitor, past interaction history with the homeowner, past interaction history with other homeowners in the neighborhood, and any risk of danger, among many other considerations. The numerical value, for example, may range from 0 to 3, with the highest value being given for full and complete answers and the lowest value being given for nonexistent information.

A numerical value may be easy to understand for younger and older residents. The scoring/ranking engine 314 may alternatively output an instruction to "open" or "do not open" the homeowner's door, which may be a written or verbal recommendation provided to the homeowner based on consideration of the factors recited above. An instruction to open the door may be given, for example, when the score generated by the scoring/ranking engine 314 exceeds a predetermined threshold indicated in the homeowner's profile.

For example, each factor considered by the scoring/ranking engine 314 of the cognitive vetting program 110a, 110b may be given a numerical value (i.e., a score) between 1 and 10, where a numerical value of 1 corresponds to an indication that the homeowner should open the door, and a numerical value of 10 corresponds to an indication that the homeowner should not open the door. The cognitive vetting program 110a, 110b may average the values of all factors to reach a final determination as to whether to open the door for an unsolicited visitor. A predetermined threshold of 5, for example, may be used as a cutoff to determine when a recommendation to open the door should be provided to the homeowner.

The visitor interaction history 316 may include a recording of all conversations in the front door area of a residence as well as relevant metadata to provide context to an interaction. Visitor interaction history 316 may also include conversations that are shared among residences in the same geographic area. A homeowner may have the ability to strike certain conversations from the record as needed.

The notification engine 318 may facilitate the notification of recommendations to various channels. The notification engine 318 may be a physical panel on the inside of the homeowner's home or may be accessed through an alert on a mobile application or via an email or a subscription service.

The reporting module 320 may provide a management dashboard to display any activity within the cognitive vetting program 110a, 110b. A user may filter displayed data based on the user's desired information.

An API module 322 may provide a platform to systematically integrate the cognitive vetting program 110a, 110b with other systems. The API module 322 may be integrated with public databases, and public security systems, among many other connected databases, based on user (i.e., homeowner) preference and availability.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
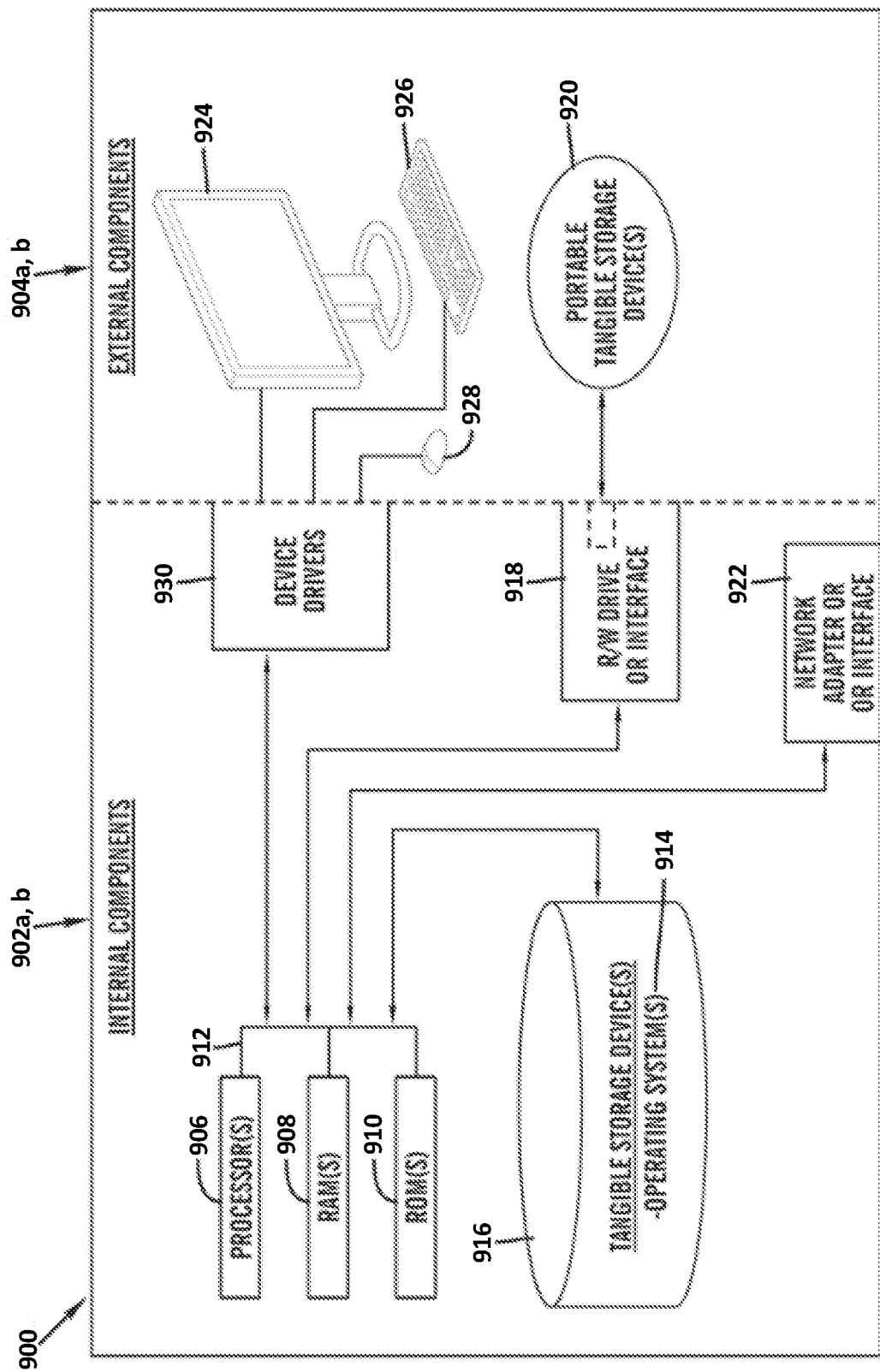
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the cognitive vetting program 110*a* in client computer 102, and the cognitive vetting program 110*b* in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cognitive vetting program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the cognitive vetting program 110*a* in client computer 102 and the cognitive vetting program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cognitive vetting program 110*a* in client computer 102 and the cognitive vetting program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
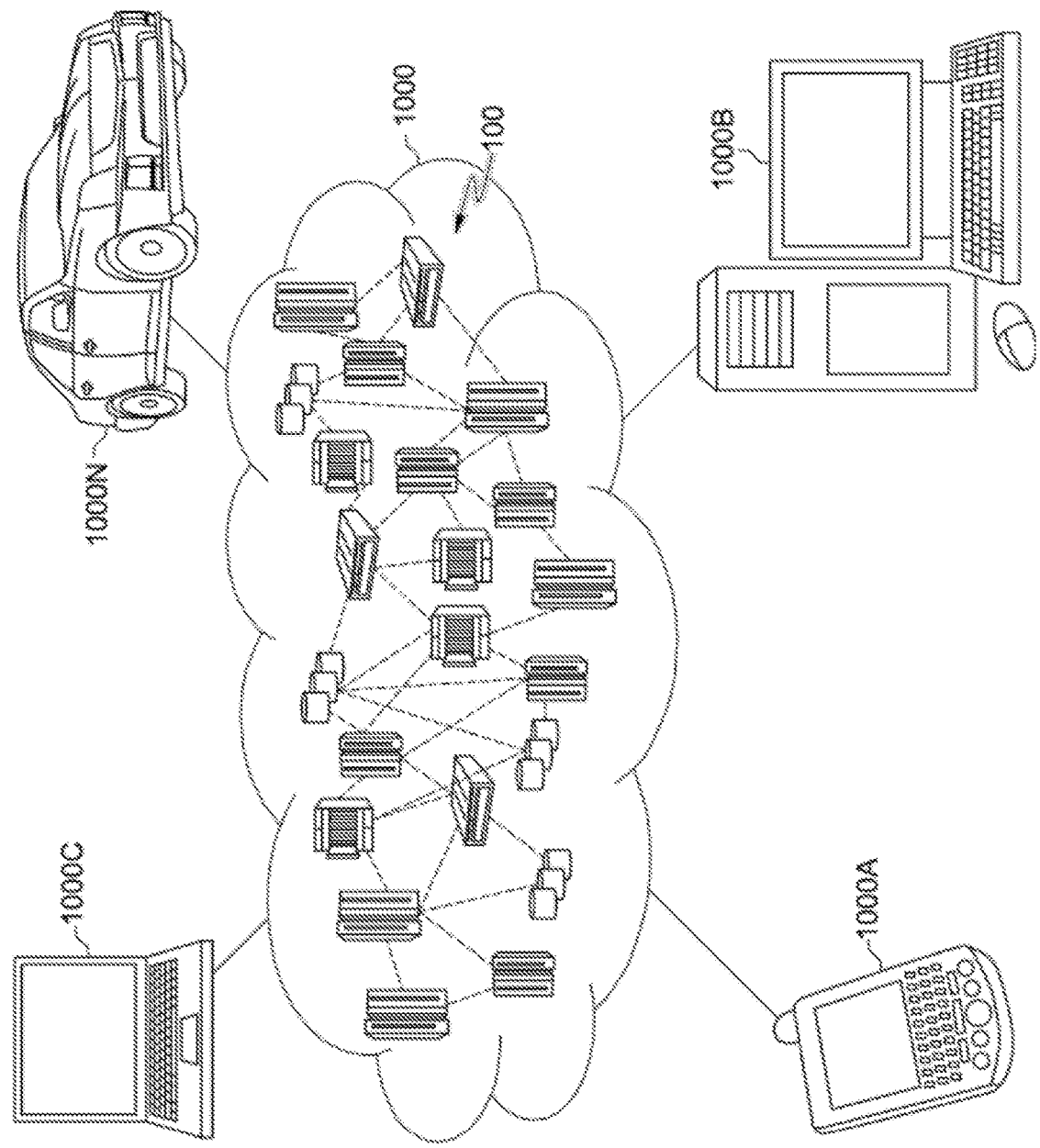
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
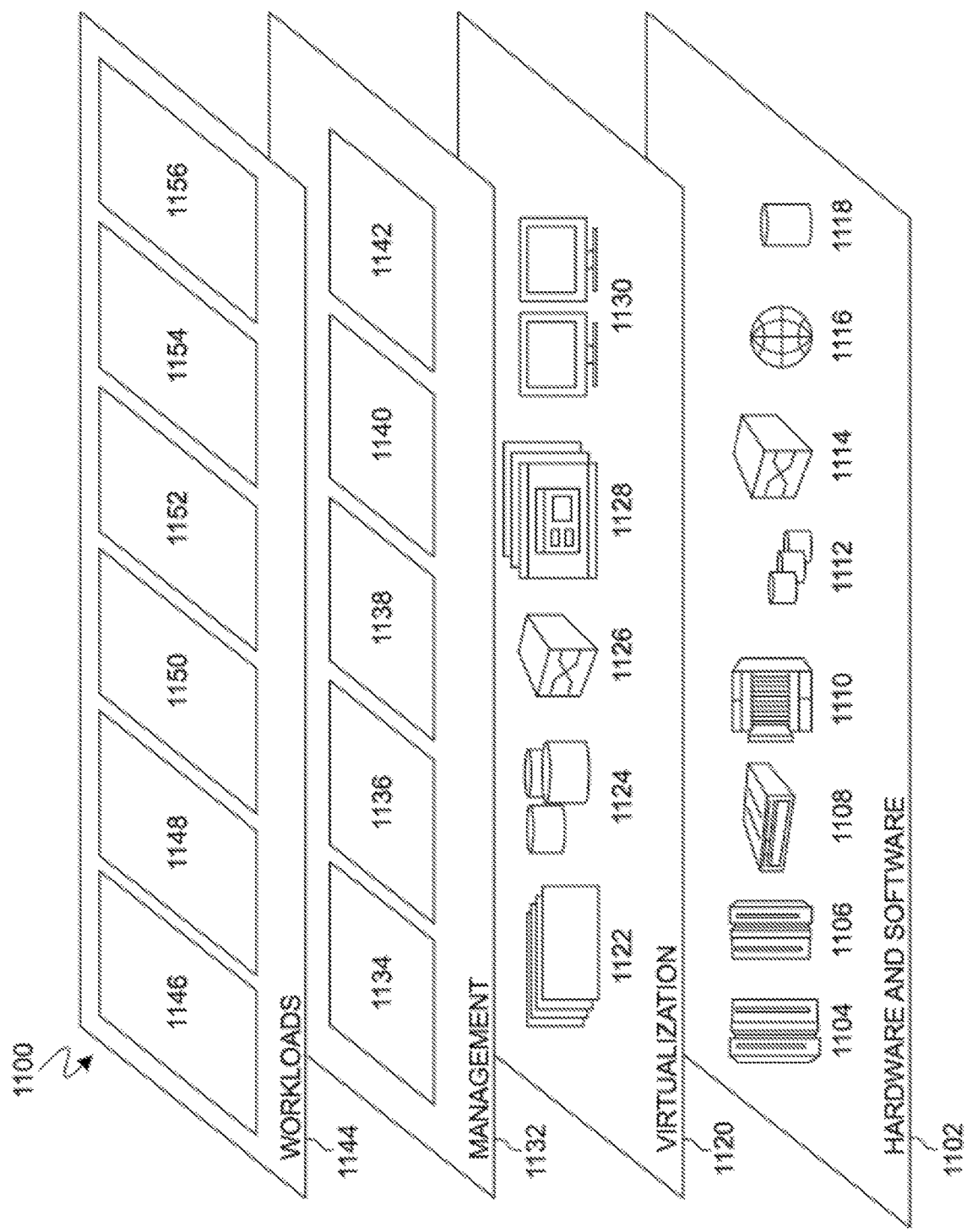
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cognitive vetting program 1156. A cognitive vetting program 110a, 110b provides a way to vet unsolicited residential visitors in an automated and cognitive manner.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cognitive vetting, the method comprising:
determining, by one or more processors, that an identified person is not expected;
retrieving, by one or more processors, historical information relevant to a past interaction with the identified person;
enabling, by one or more processors, a present interaction with the identified person; and
determining, by one or more processors, a recommendation based on an analysis of the retrieved historical information and the present interaction.

2. The method of claim 1, further comprising:
determining, by one or more processors, that the identified person is not on a blacklist.

3. The method of claim 1, wherein determining that the identified person is not expected further comprises:
utilizing, by one or more processors, a visual recognition technique to verify an identity of the identified person.

4. The method of claim 1, wherein the retrieved historical information relevant to the past interaction with the identified person is selected from the group consisting of a recorded video clip, a recorded audio clip, and an insight.

5. The method of claim 1, wherein enabling the present interaction with the identified person further comprises:
utilizing, by one or more processors, a chatbot to engage in conversation.

6. The method of claim 1, wherein determining the recommendation based on the analysis of the retrieved historical information and the present interaction further comprises:
analyzing, by one or more processors, a historical interaction, wherein the historical interaction is selected from the group consisting of a tone of voice, a personality, and a video; and
generating, by one or more processors, a score.

7. The method of claim 1, further comprising:
determining, by one or more processors, that the identified person is on a blacklist; and
generating, by one or more processors, an alert.

8. A computer system for cognitive vetting, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
determining that an identified person is not expected;
retrieving historical information relevant to a past interaction with the identified person;
enabling a present interaction with the identified person; and
determining a recommendation based on an analysis of the retrieved historical information and the present interaction.

9. The computer system of claim 8, further comprising:
determining that the identified person is not on a blacklist.

10. The computer system of claim 8, wherein determining that the identified person is not expected further comprises:
utilizing a visual recognition technique to verify an identity of the identified person.

11. The computer system of claim 8, wherein the retrieved historical information relevant to the past interaction with the identified person is selected from the group consisting of a recorded video clip, a recorded audio clip, and an insight.

12. The computer system of claim 8, wherein enabling the present interaction with the identified person further comprises:
utilizing a chatbot to engage in conversation.

13. The computer system of claim 8, wherein determining the recommendation based on the analysis of the retrieved historical information and the present interaction further comprises:
analyzing a historical interaction, wherein the historical interaction is selected from the group consisting of a tone of voice, a personality, and a video; and
generating a score.

14. The computer system of claim 8, further comprising:
determining that the identified person is on a blacklist; and
generating an alert.

15. A computer program product for cognitive vetting, comprising:
one or more computer-readable storage media and program instructions stored on at least one of the one or more tangible storage media, the program instructions executable by a processor to cause the processor to perform a method comprising:
determining that an identified person is not expected;
retrieving historical information relevant to a past interaction with the identified person;
enabling a present interaction with the identified person; and
determining a recommendation based on an analysis of the retrieved historical information and the present interaction.

16. The computer program product of claim 15, further comprising:
determining that the identified person is not on a blacklist.

17. The computer program product of claim 15, wherein determining that the identified person is not expected further comprises:
utilizing a visual recognition technique to verify an identity of the identified person.

18. The computer program product of claim 15, wherein the retrieved historical information relevant to the past interaction with the identified person is selected from the group consisting of a recorded video clip, a recorded audio clip, and an insight.

19. The computer program product of claim 15, wherein enabling the present interaction with the identified person further comprises:
utilizing a chatbot to engage in conversation.

20. The computer program product of claim 15, wherein determining the recommendation based on the analysis of the retrieved historical information and the present interaction further comprises:
analyzing a historical interaction, wherein the historical interaction is selected from the group consisting of a tone of voice, a personality, and a video; and
generating a score.

* * * * *